US012070759B2

(12) United States Patent
Potters et al.

(10) Patent No.: US 12,070,759 B2
(45) Date of Patent: Aug. 27, 2024

(54) CYCLONE SEPARATOR

(71) Applicant: ATLAS COPCO AIRPOWER, NAAMLOZE VENNOOTSCHAP, Wilrijk (BE)

(72) Inventors: Tom Potters, Wilrijk (BE); Tom Saenen, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 457 days.

(21) Appl. No.: 17/422,630

(22) PCT Filed: Feb. 18, 2020

(86) PCT No.: PCT/IB2020/051330
§ 371 (c)(1),
(2) Date: Jul. 13, 2021

(87) PCT Pub. No.: WO2020/170123
PCT Pub. Date: Aug. 27, 2020

(65) Prior Publication Data

US 2022/0088615 A1 Mar. 24, 2022

(30) Foreign Application Priority Data

Feb. 21, 2019 (BE) .................................. 2019/5113

(51) Int. Cl.
*B04C 5/103* (2006.01)
*B04C 5/04* (2006.01)
*F04B 39/04* (2006.01)

(52) U.S. Cl.
CPC ................ *B04C 5/103* (2013.01); *B04C 5/04* (2013.01); *F04B 39/04* (2013.01)

(58) Field of Classification Search
None
See application file for complete search history.

(56) References Cited

U.S. PATENT DOCUMENTS 2,425,110 A 8/1947 McCurdy
3,243,941 A 4/1966 Peterson
(Continued)

FOREIGN PATENT DOCUMENTS

CN 105879501 A 8/2016
GB 818 353 A 8/1959
(Continued)

OTHER PUBLICATIONS

International Search Report for PCT/IB2020/051330 dated May 26, 2020 [PCT/ISA/210].
(Continued)

*Primary Examiner* — Richard C Gurtowski
(74) *Attorney, Agent, or Firm* — Sughrue Mion, PLLC

(57) ABSTRACT

Cyclone separator 1 for separating liquid from a flow 8 of gas and liquid, comprising a housing with a mainly tubular inner wall 2, whereby an inlet 3 is provided in the housing for carrying the flow at least partially tangentially against the inner wall, whereby an outlet 4 is further provided at the top of the housing, so that during operation the flow forms a vortex 5 between the inlet and the outlet, and whereby the liquid 6 impacts against the inner wall due to centrifugal force in order to be discharged 11, characterized in that the housing, at least in a zone above the inlet, has a mainly tubular auxiliary wall 7, whereof an outer side is spaced from and directed towards the inner wall, so that during operation the vortex is at least partially bounded by an inner side of the auxiliary wall in order to reduce contact between the vortex and the liquid at the inner wall.

16 Claims, 5 Drawing Sheets

(56) References Cited

U.S. PATENT DOCUMENTS

| | | | | |
|---|---|---|---|---|
| 2003/0221996 | A1* | 12/2003 | Svoronos .................. | B04C 5/13 209/1 |
| 2009/0255406 | A1 | 10/2009 | Sakatani et al. | |

FOREIGN PATENT DOCUMENTS

| | | | |
|---|---|---|---|
| WO | 2011/082972 | A1 | 7/2011 |
| WO | 15107610 | A1 | 7/2015 |
| WO | 18185914 | A1 | 10/2018 |

OTHER PUBLICATIONS

Written Opinion for PCT/IB2020/051330 dated May 26, 2020 [PCT/ISA/237].

* cited by examiner

CYCLONE SEPARATOR

CROSS REFERENCE TO RELATED APPLICATIONS

This application is a National Stage of International Application No. PCT/IB2020/051330 filed Feb. 18, 2020, claiming priority based on Belgium Patent Application No. BE2019/5113 filed Feb. 21, 2019.

BACKGROUND OF THE INVENTION

Field of the Invention

The present invention relates to a cyclone separator for separating liquid from a flow of gas and liquid, whereby the cyclone separator has a housing with a mainly tubular inner wall provided with an inlet for the flow, in order to transport the flow at least partially tangentially along the inner wall, whereby there is also an outlet provided at the top of the housing, so that during operation the flow forms a vortex between the inlet and the outlet, and whereby the resulting centrifugal force brings the liquid into contact with the inner wall in order to be discharged.

Background

A cyclone separator is a device that uses centrifugal force to separate a mixture of materials on the basis of differences in specific gravity (relative density). The device is used, for example, to remove dust from an airflow or to remove particles from water. The present invention relates in particular to a cyclone separator for removing liquids from a gas. The liquid thereby has a higher specific gravity than the gas.

In a cyclone separator, a flow of gas and liquid is pumped tangentially into a tubular section, causing this flow to rotate and create a vortex. The heavy particles, such as liquid, are carried against the inner wall, where they flow downwards. As a result, the heavy particles end up in a lower part of the cyclone separator, where they can be discharged. The rest of the flow leaves the cyclone through an almost centrally located opening at the upper end of the tubular section.

A known disadvantage of a cyclone separator is that the separation efficiency is suboptimal. More specifically, a well-known cyclone separator has been found to work sub-optimally for separating liquid from a flow of gas and liquid with a high load. Load is defined as the mass flow rate liquid over the mass flow rate gas. In practice, the mass ratio of oil to gas with an oil-injected compressor can be about 5 or higher. With a flow rate of 3 kg total output per second, up to 2.5 kg of oil per second can come out of the compressor's outlet along with the compressed gas. This is an example of a flow of compressed air and oil with a high load. It will be clear thereby that it is advantageous to remove a maximum amount of oil from the air via the cyclone separator, with minimum negative influence on the airflow. In particular, it is preferable to have up to a thousand times less liquid in the gas at an outlet of the cyclone separator than at the inlet of the cyclone separator. In current engineering techniques for high-load gases, the liquid is separated from the gas in several steps in order to obtain such a percentage reduction of liquid in the flow.

It is an object of the invention to provide a separator for efficiently separating liquid from a flow of gas and liquid along with a reduced disruption of the airflow.

SUMMARY OF THE INVENTION

To this end, the cyclone separator, according to the invention, is characterized by the fact that the housing, at least in a zone above the inlet, has a mainly tubular auxiliary wall, of which the outer side is spaced at a distance from and directed towards the inner wall, such that during operation the vortex is at least partially bordered by the inner side of the auxiliary wall in order to reduce contact between the vortex and the liquid at the inner wall.

The invention is based on the insight that liquid that impacts the inner wall of the cyclone separator's housing can still return to the flow through interaction of the liquid surface with the vortex. The two factors that are the main determinants for the re-uptake of liquid in the flow are the speed of the flow at the liquid's surface and the thickness of the film on the wall. If one of these values is too large, the liquid surface will no longer be smooth. Factors such as surface tension, viscosity, density difference, adhesion to the wall, etc. also play a role. In practice, the liquid surface of the liquid that impacts the inner wall of the housing is not always smooth. Because the vortex flows along a non-smooth surface, a portion of the liquid that has impacted against the inner wall of the housing is still included in the flow, which reduces the efficiency of the separation. The non-smooth surface further enhances the uptake of fluid in the vortex because fluid particles are more easily detached from the non-smooth surface.

The invention is provided with an auxiliary wall that forms part of the housing, such that the majority of the liquid is separated against the inner wall of the housing, while a part of the vortex moves within the auxiliary wall. Part of the liquid will be deposited against the auxiliary wall and will there form a noticeably thinner and therefore also more stable film. Due to the auxiliary wall, the liquid surface that impacts the inner wall is at least partially shielded from the vortex so that interaction between the liquid surface and the vortex is reduced. This will reduce the effect of the liquid being absorbed back into the flow, making the separation more efficient. Tests and simulations have shown that the efficiency and the amount of liquid that can be discharged from a flow of gas and liquid with a cyclone separator according to the invention is appreciably higher than with a current state-of-the-art cyclone separator. As a result, the cyclone separator according to the invention is particularly suitable for separating liquid from a flow of gas and liquid with a high load.

The inlet is preferably oriented during operation so that the flow from the inlet is fed almost entirely directly to the inner wall. In other words, there are no significant elements in the path that extends between the inlet and the inner wall. Because the flow almost completely ends up directly against the inner wall, the liquid in the flow will also be pressed maximally against the inner wall to form a film or a layer of liquid there. By forming a film or layer of liquid, the liquid will have a tendency to flow downwards to be discharged. The flow will move from the inlet to the outlet of the housing following a vortex. The vortex creates centrifugal force that causes the liquid particles to move to the outside of the vortex, where the liquid particles will typically deposit against the inner wall and auxiliary wall of the housing.

Preferably, the auxiliary wall is positioned relative to the inner wall such that, during operation, a lower segment of the vortex is bounded along its circumference by the inner wall and an upper segment of the vortex is bounded along its circumference by the inner side of the auxiliary wall. The inlet is herein preferably provided at the level of the lower segment of the vortex. Because the vortex is bounded by the inner wall along its circumference in a lower portion, the majority of the liquid in the liquid and gas flow will deposit against the inner wall of the housing. When the upper segment of the vortex is bounded along its circumference by the inner side of the auxiliary wall, the auxiliary wall will shield the vortex from the liquid surface that is created at the inner wall of the housing. As explained above, this reduces the re-uptake of liquid back into the vortex and thereby increases the efficiency of the separation.

Preferably, part of the liquid remaining in the flow ends up against the inner side of the auxiliary wall through centrifugal force to achieve a two-stage separation. The lower segment of the vortex is bounded along its circumference by the inner wall, where most of the liquid ends up. Different phases of liquid can be considered as occurring in the flow. The first phase is known as free liquid, the second phase is known as drops, and the third phase is known as mist. Only a limited amount of liquid can be kept in suspension in a gas flow. Therefore, most of the mass will typically be found in the free liquid. In the lower segment, mainly the free liquid is separated. However, because the vortex also extends through the inner side of the auxiliary wall, a portion of the liquid from the flow, hereinafter referred to as residual liquid, will also impact this auxiliary wall through centrifugal force, where it typically forms a much thinner and therefore more stable film compared to the deposit against the inner wall. In practice, liquid that is mainly in the second phase will impact the inner side of the auxiliary wall. This residual liquid will also drain off the auxiliary wall to be discharged. This results in a two-stage separation. In particular, the first stage will be realized through the inner wall, while a second stage will be realized through the inner side of the auxiliary wall. The two-stage separation significantly increases the efficiency of separation, which greatly improves the percentage of liquid at the outlet relative to the inlet compared to single-stage separators.

Preferably, a substantially annular chamber is formed between the inner wall and the outer side of the auxiliary wall with a thickness determined by the distance between the inner wall and the outer side, and said chamber is open at the bottom to allow liquid at the inner wall to flow into and out of the chamber. The annular chamber provides a space in which at least part of the liquid that comes into contact with the inner wall of the housing can flow in and out. This liquid is shielded from the vortex in this space, so that the vortex cannot interact with the liquid that is in this space. It will be clear to the skilled professional that the ring thickness is related to the capacity of the space to receive liquid. This capacity is determined based on the intended use of the cyclone separator. When the cyclone separator is used to separate a large amount of liquid, the ring will be provided with a corresponding thickness to allow the large amount of liquid to flow into and out of the chamber. A skilled professional understands that such a configuration and optimization can be done on the basis of tests and simulations. The distance between the outside of the auxiliary wall and the inner wall is thereby kept to a minimum. As a result, the surface of the inner wall of the auxiliary wall is maximized, so that the uptake of liquid and the braking of the vortex on the inner wall are minimized. This is in contrast to known roof skimmers, where the distance between the roof skimmer and the inner wall will typically be larger because there is in principle no appreciable amount of liquid on the inner side of the roof skimmer, and it does not extend over a significant height of the vortex.

The chamber's height is preferably greater than the ring thickness. An annular chamber with a height greater than the ring thickness appears to be optimal for allowing liquid that impacts the inner wall of the housing to flow into and out of the chamber through centrifugal force. The height is preferably large enough to have sufficient capacity for the liquid from the first separation. A skilled professional can determine the height based on tests and simulations. This height is not necessarily the same as the height of the inner side of the auxiliary wall. The total height of the cyclone separator can be optimized on the basis of the known properties of the incoming flow, more specifically on the basis of the load and nature, including average droplet size, of the incoming flow. A little load with small drops will thereby lead to an inner wall with a lower height than the auxiliary wall, and a larger load with larger drops will lead to an inner wall that has a greater height than the auxiliary wall.

Preferably, the chamber has a ring thickness that is smaller than the diameter of the inlet. When the ring thickness is smaller than the diameter of the inlet, the disturbance of the vortex by the auxiliary wall appears to be minimal, so that the airflow is less negatively affected.

The annular chamber is preferably closed at the top. Closing the annular chamber at the top forces the vortex to extend to the outlet from the inner side of the auxiliary wall. As a result, the airflow, and more specifically the flow direction through the cyclone separator, is optimized.

The inner wall is preferably formed around a first axis and the auxiliary wall is formed around a second axis, whereby the first axis and the second axis substantially coincide. By allowing the axis of the inner wall to coincide with the axis of the auxiliary wall, the inner wall and the auxiliary wall extend concentrically by a substantial amount. Due to the concentric structure, the vortex is optimally guided from the inlet to the outlet, so that there is minimal negative effect on the airflow through the cyclone separator. Furthermore, the depositing of liquid against the walls as a result of the centrifugal force appears to be optimal when the walls extend concentrically.

The inner wall preferably forms a lower segment of the housing, and the auxiliary wall extends together with the inner wall to the top of the housing. The overlapping of the auxiliary wall and the inner wall forms a space between the outer side of the auxiliary wall and the inner wall, as a result of which liquid that impacts the inner wall through centrifugal force is not influenced by the vortex. The vortex will in fact extend within the inner side of the auxiliary wall. At the location of the lower segment, the cyclone separator will exhibit an operation comparable to a traditional cyclone separator. Above the lower segment, the efficiency of the invention's cyclone separator is significantly improved because the interaction between the vortex and the liquid at the inner wall is reduced. A second separation of liquid will occur as a result of centrifugal force, so that a two-stage separation of liquid will occur from the flow.

The housing preferably has a discharge opening at the bottom for discharging the liquid. The liquid can be discharged from the cyclone separator via a discharge opening in a virtually continuous manner. It should be clear that the term "at the bottom" can be broadly interpreted and that the outlet can also be provided at the side of the housing, in a lower segment thereof.

The invention further relates to a compressor for compressing a gas, whereby said compressor is provided with at least one compressor element with an outlet for compressed gas, the aforementioned outlet for compressed gas being connected to the inlet of the cyclone separator according to one of the preceding claims. In an oil compressor or water compressor, oil or water is added for lubricating parts during the compressing of the air, provided with an extra seal and for further secondary reasons. The liquid used during the compression of the gas will typically at least partially pass along with the gas through the outlet of the compressor element. By fitting a cyclone separator according to the invention behind the compressor, the majority of the liquid can be separated from the flow of gas and liquid that comes out of the compressor element. This enables, on the one hand, the quick and efficient recovery of the liquid and preferably its re-use. This also enables the efficient further transport and use of the compressed gas.

The invention further relates to a method for separating liquid from a flow of liquid and gas, whereby the method comprises:

introducing the flow through an inlet into a housing with a mainly tubular inner wall, whereby the flow at least partially tangentially impacts against the inner wall;

discharging the flow through an outlet provided at the top of the housing;

all so that:

the flow forms a vortex between the inlet and the outlet; and the liquid impacts the inner wall due to centrifugal force in order to be discharged, and whereby the method comprises discharging the liquid;

characterized in that the vortex, at least in the zone above the inlet, extends at least partially against an inner side of an auxiliary wall in order to reduce contact between the vortex and the liquid at the inner wall.

The method is focused on the use of the cyclone separator as described above. The advantages and effects of the method are comparable to the advantages and effects described above. Applying the method results in a two-stage separation of liquid from a flow of liquid and gas. Furthermore, the liquid that comes into contact with the inner wall of the housing is at least partially shielded from the vortex extending through the housing, which minimizes the interaction between the liquid surface and the vortex. This minimizes the re-uptake of liquid back into the vortex.

Residual liquid preferably ends up against the inner side of the auxiliary wall to be discharged, and the method further comprises discharging the residual liquid. A complete two-stage separation of liquid from the flow is achieved by discharging the residual liquid.

BRIEF DESCRIPTION OF THE DRAWINGS

The invention will be explained in more detail below using the embodiment examples depicted in the drawings.

In the drawings.

In the drawings, the same reference number is assigned to the same or comparable elements.

DETAILED DESCRIPTION OF THE INVENTION

Figure 1:
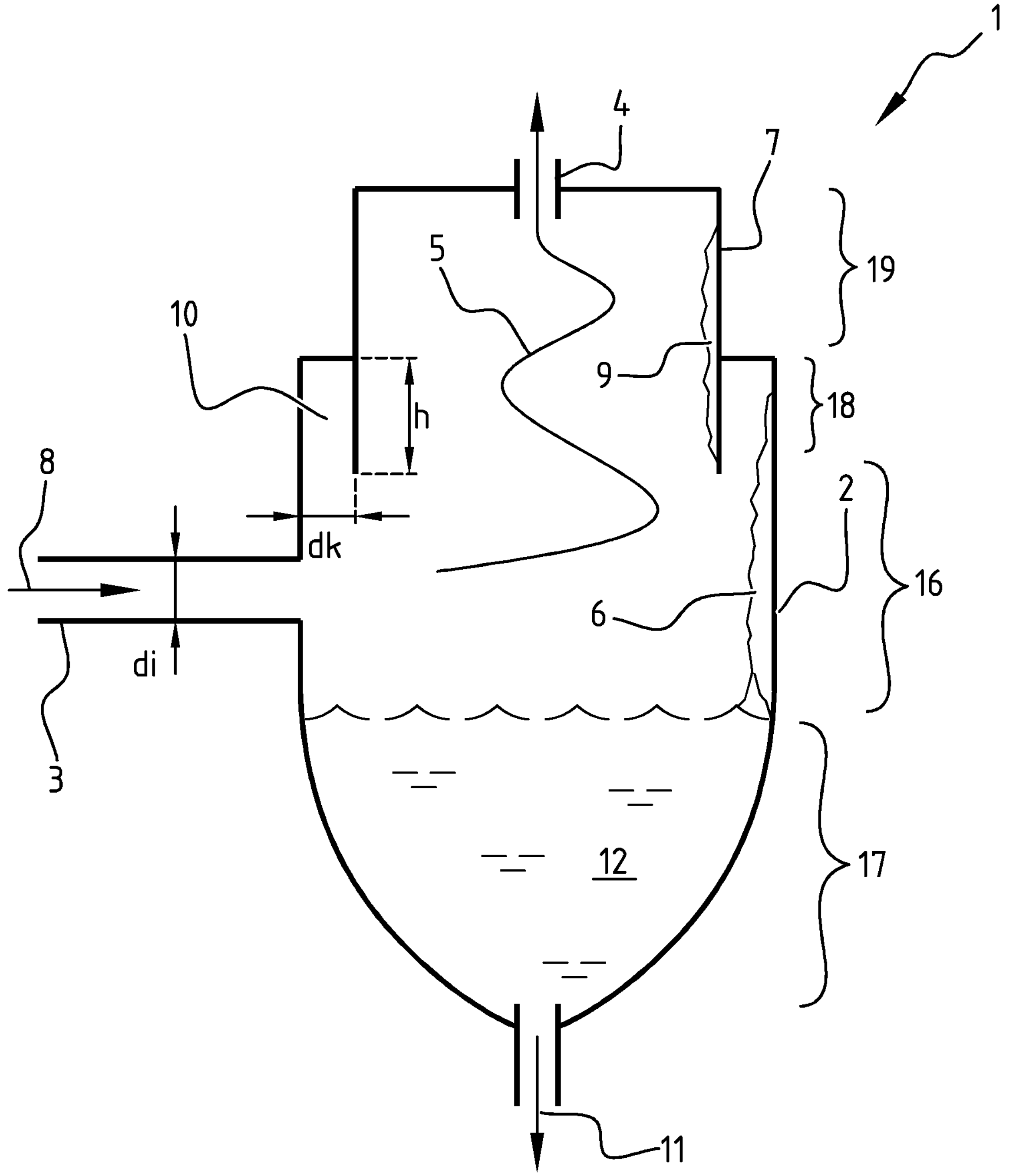
FIG. 1 shows a first embodiment of a cyclone separator according to the invention.

FIG. 1 shows a cyclone separator 1 according to a preferred embodiment of the invention. The cyclone separator 1 comprises a housing, which in this case forms a barrel. A space is delimited by the housing. Gas and/or liquid can be passed through the space.

Figure 6A:
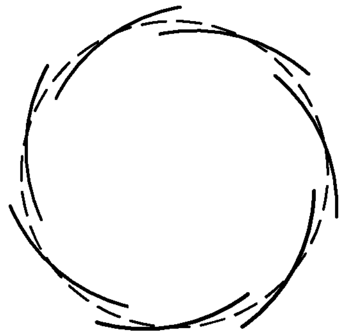
FIGS. 6A, 6B and 6C show cross-sections of some examples of mainly tubular walls.
Figure 6B:
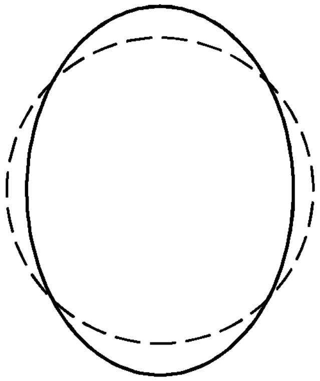
Figure 6C:
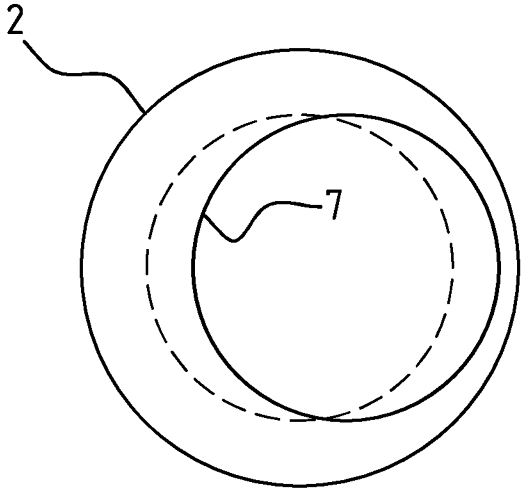

The housing of the cyclone separator 1 has an inner wall 2 that is mainly tubular. In this case, "mainly tubular" is defined as a shape recognizable by the average skilled professional as the shape of a tube, preferably of a tube with a substantially round cross-section. Mainly tubular is preferably defined as mainly cylindrical with a shape deviating at most by 20%, preferably no more than 10%, from an ideal cylindrical shape. The deviation can be continuous or discontinuous. The deviation can manifest itself in the radial direction and/or in the axial direction. The wall 2 can, for example, be slightly oval or slightly conical and still be considered mainly tubular. FIGS. 6A, 6B and 6C show cross-sections of some examples of mainly tubular-shaped walls, each of which can act as an auxiliary wall and/or as an inner wall of the housing. A circle is shown with a dotted line, and the wall is shown with a solid line. FIG. 6A shows blades that together form a mainly tubular wall. FIG. 6B shows a somewhat oval wall. FIG. 6C shows a tubular wall that is placed slightly eccentrically. The wall from FIG. 6C can be placed eccentrically as an auxiliary wall 7 with respect to the inner wall 2, which is discussed in more detail below.

The housing of the cyclone separator 1 is provided with an inlet 3 at the location of the inner wall 2. The inlet 3 is provided for introducing a flow of gas and liquid into the housing. The inlet 3 is typically shaped as a tube component that can be connected to form a larger whole, so that the flow 8 can flow through the tube component and thus be introduced into the housing. The inlet 3, and more specifically the tube component that forms the inlet, is positioned and/or oriented with respect to the mainly tubular inner wall 2 so that the flow arrives at least partially tangentially to the inner wall 2 in the housing. 'At least partially tangentially' is defined as eccentric with respect to the mainly tubular inner wall. As a result, the flow entering the cyclone will cause a circular movement with respect to the tubular inner wall 2 without further drive. An outlet 4 is provided at the top center of the housing of the cyclone separator 1. The circular movement will form a vortex 5 between the inlet 3 and the outlet 4. Preferably, the inlet 3, and more specifically the tube component that forms the inlet, is placed almost horizontally. "Almost horizontal" is defined as referring to a maximum deviation of 20%, preferably no more than 10%, from the horizontal direction. It is even more preferable for the inlet 3 to be horizontal, or more specifically for the tube component that forms the inlet 3 to be horizontal.

The inlet 3 is positioned and/or oriented such that the flow 8 from the inlet 3 almost completely impacts against the inner wall 2. Thus, no auxiliary elements or auxiliary walls or other parts are placed in the path between the inlet 3 and the inner wall 2. The flow 8 is minimally disrupted because the flow 8 from the inlet 3 almost completely ends up on the inner wall 2. It will be clear to a skilled professional that a disruption of the flow 8 entails a decrease in the efficiency of the cyclone separator 1. Preferably, the flow 8 will be smoothly transformed into a vortex 5, which further flows smoothly into an output flow from the outlet 4 because it almost completely directly impacts against the inner wall. This flowing, minimally disrupted flow ensures good efficiency.

The housing of the cyclone separator 1 further comprises an auxiliary wall 7. The auxiliary wall 7 is mainly tubular. The auxiliary wall 7 is located at least above the inlet 3. In some embodiments, the auxiliary wall 7 is not only above but also partially at the level of the inlet 3. The auxiliary wall 7 extends at least partially within the inner wall 2. As a result, the auxiliary wall 7 has an outer side, of which at least a part is at a distance from and directed towards the inner wall 2. This creates a space 10 between the outside of the auxiliary wall 7 and the inner wall 2. The space 10 has the shape of a mainly annular chamber that is open at the bottom. The annular chamber 10 is preferably closed at the top.

During operation of the cyclone separator 1, liquid in the flow 8 will impact against the inner wall 2 due to centrifugal force. This liquid is shown schematically in FIG. 1 and is indicated by reference number 6. Because the flow mainly impacts tangentially and preferably also mainly horizontally against the upright inner wall 2, the liquid 6 will form a layer that spreads against the inner wall 2 both above the inlet 3 and below the inlet 3. After the liquid has impacted against the inner wall 2, it will only flow under the influence of its own inertia, gravity and the shear force of the flow that blows over it. Due to the auxiliary wall, the drive through the flow largely falls away so that the rotation of the film of liquid at the inner wall 2 stops more quickly. The liquid 6 at the inner wall 2 will typically flow downwards due to gravity in order to be collected at the bottom in the cyclone separator 1. The collected liquid is indicated in FIG. 1 by reference number 12.

The space 10 has a size that is determined by the height h of the space and the ring thickness dk; this is the distance between the outside of the auxiliary wall 7 and the inner wall 2, measured in the radial direction of the cyclone separator 1. The size of the chamber 10 is determined on the basis of the intended purpose of the cyclone separator, in particular the rate of the flow 8 and the gas-liquid ratio of the flow 8. The preferred ring thickness dk in practice is preferably larger than 5 mm on average, even more preferably—larger than 8 mm, and preferably smaller than 30 mm on average, even more preferably—smaller than 20 mm, and most preferably approximately 15 mm. The ring thickness dk is preferably smaller than the diameter of the inlet di. The height h is preferably greater than the diameter of the inlet di. The inner wall has a first diameter and the auxiliary wall has a second diameter. The second diameter is preferably at least 70% of the first diameter, more preferably at least 80%, and most preferably at least 85%. More generally, the ring thickness will be minimized to provide just enough room for the liquid that comes into contact with the inner wall. In other words, the diameter of the auxiliary wall will be maximized without thereby making the annular space between the auxiliary wall and the inner wall too small for the load and the first separation.

The auxiliary wall 7 also has an inner side. The embodiment in FIG. 1 shows the inner side of the auxiliary wall extending higher than the inner wall 2. The auxiliary wall 7 hereby forms the uppermost part of the housing. In the embodiment from FIG. 1, an uppermost segment 19 can therefore be indicated, in which the housing is formed by the auxiliary wall 7; a middle segment 18 can be indicated whereby the auxiliary wall 7 and outer wall 2 overlap each other; and a lower segment 16 can be indicated that is formed by the outer wall 2. The cyclone separator 1 also typically comprises a discharge segment 17 located below the lower segment 16, in which the liquid 12 is collected to be discharged via a discharge opening 11.

The inner side of the auxiliary wall 7 is formed such that the vortex 5 extending between the inlet 3 and the outlet 4 is at least partially bounded by the inner side of the auxiliary wall 7. More specifically, a lower segment of the vortex 5 will be delimited by the inner wall 2, while the uppermost segment of the vortex 5 will be delimited by the auxiliary wall 7. The consequence of this has been extensively discussed above: the liquid 6 which is located at the inner wall 2 will be shielded by the auxiliary wall 7 from at least a part of the vortex 5. In particular, the liquid 6 present in the space 10 will be almost completely shielded from the vortex 5. This reduces the re-uptake of liquid to the flow (re-entrainment). Reducing the re-uptake of liquid to the flow increases the efficiency of separation. In particular, the flow at the location of the outlet 4 will have significantly less load than the flow at the location of the inlet 3. In this case, load is defined as mass quantity of liquid over mass quantity of gas.

Figure 2:
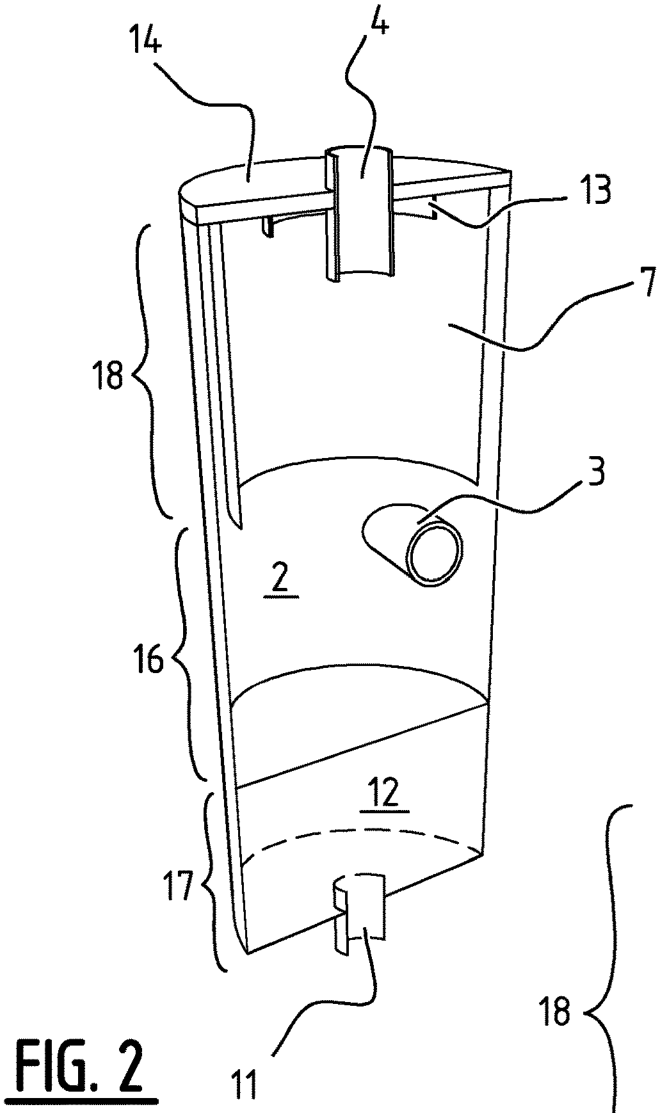
FIG. 2 shows a second embodiment of a cyclone separator according to the invention.

FIG. 2 shows an alternative embodiment of the cyclone separator 1. In the embodiment from FIG. 2, the housing of the cyclone separator 1 is almost completely formed by a first tube component that contains the inner wall 2. An auxiliary wall 7 is placed in the housing at the top of the cyclone separator 1. The auxiliary wall 7 is formed as a second tube component with a diameter that is smaller than the first tube component. The tube components are positioned relative to each other with almost coincident axes. The embodiment from FIG. 2 also has a boundary protrusion 13, also known as a roof skimmer, provided on the upper side of the housing, and said protrusion 13 extends around the outlet 4. FIG. 2 also shows how the outlet 4 is formed as a tube component that extends at least partially into the space formed by the housing. In particular, the outlet tube component extends into the housing with a length that is approximately equal to the diameter of the inlet 3.

In FIG. 2, the inlet 3 is formed as a tube component that extends at least partially into the housing. Also, the inlet 3 is not positioned completely tangentially with respect to the inner wall 2. In other words, the inlet tube component penetrates the wall of the housing. This has some advantages. It makes it easier to manufacture the inlet tube component. In practice, the inlet tube component is typically welded against the wall of the housing. It appears in practice to be considerably simpler to weld a penetrating tube component that is not completely tangentially positioned with respect to the wall. The inlet 3 preferably has a length that is limited so that it does not cross the axis of the housing. At the location of the opening, the inlet 3 is preferably cut obliquely in order to influence the direction of the flow and thereby promote the formation of the vortex. A further advantage has to do with the re-uptake of liquid to the flow. The interaction of the liquid 6 at the inner wall 2 and the flow that enters the housing via the inlet 3 is minimized. A further advantage relates to the reduction of the impact zone of the flow on the inner wall 2.

The inlet 3 is preferably provided, as viewed in the height direction of the cyclone separator, in a central zone thereof. Preferably, at least 30% of the cyclone separator extends above the inlet 3 and at least 30% of the cyclone separator extends below the inlet 3. More preferably, at least 40% of the cyclone separator extends above the inlet 3 and at least 40% of the cyclone separator extends below the inlet 3. The advantage of such the inlet 3 being in such position is that the vortex 5, as viewed in the height direction, only has an upward component. Regardless of the position of the inlet 3, this appears to be advantageous for the cyclone separator's efficiency, namely that the vortex 5 only has an upward component. In other words, the vortex will not first have to turn at least partially downwards in order to then move upwards to the outlet 4. A further or alternative advantage of fitting the inlet in the central zone is that the vortex extends above the inlet and can only interact, disregarding the auxiliary wall, with half of the oil deposited against the inner wall, namely the part that blows upwards. By fitting the inlet in the central zone, it will also be more difficult for oil to reach the roof of the cyclone separator. Oil at the roof of the separator, without a roof skimmer, typically easily finds its way to the outlet.

In the embodiment of FIG. 2, a discharge segment 17 is shown, which collects the liquid 12. Above it is shown a lower segment 16 in which the inlet 3 is located. The flow is introduced into the cyclone separator 1 at the location of the lower segment via the inlet 3. The vortex 5 is created at the location of this lower segment 16. Furthermore, a middle segment 18 is shown, within which the outer wall 2 and the auxiliary wall 7 overlap. Because the outer wall 2 and the auxiliary wall 7 both extend to the top of the cyclone separator, no upper segment as in FIG. 1 is present in this embodiment. In the uppermost segment of FIG. 1, the housing is formed by the auxiliary wall 7. The top of the housing can also be provided with a lid 14. The lid 14 is preferably removable so that the housing of the cyclone separator 1 can be opened. This allows maintenance and repair. Because the construction of the cyclone separator in FIG. 2 does not have any noticeably complex components, it is possible to design the cyclone separator without a lid. More specifically, the cyclone separator has no parts that need to be replaced, also known as consumables. The cyclone separator can be made at considerably lower cost if no lid is provided.

Figure 3:
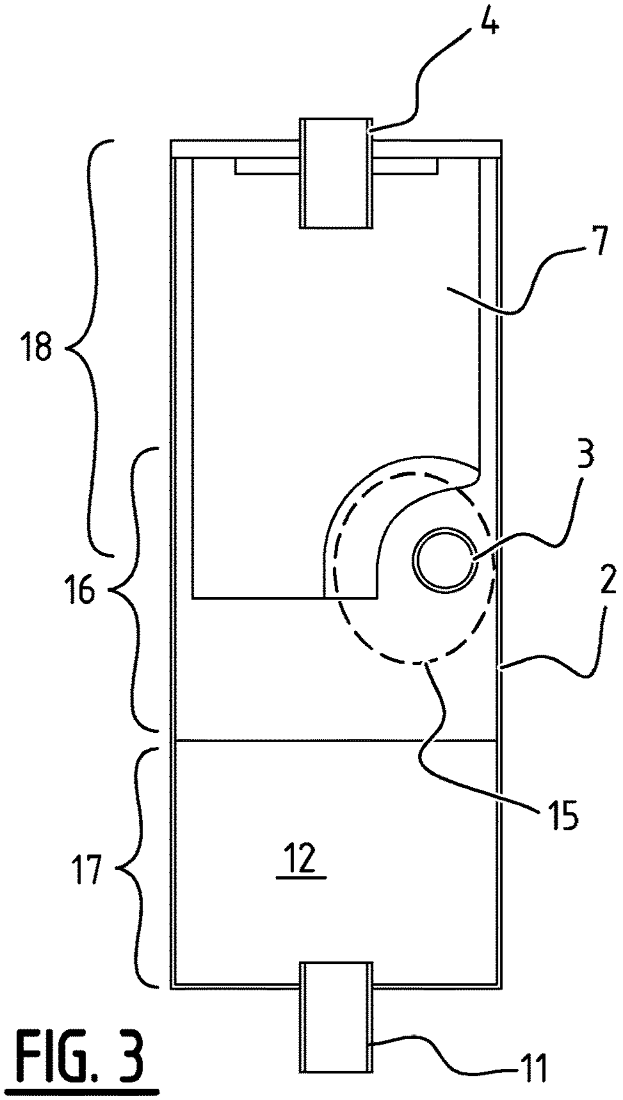
FIG. 3 shows a third embodiment of a cyclone separator according to the invention.

FIG. 3 shows a further embodiment. The embodiment in FIG. 3 differs from the embodiment in FIG. 2 only by the position and shape of the auxiliary wall 7. For a description of the general construction of the cyclone separator 1, reference is made to the description of FIG. 2.

The auxiliary wall 7 in FIG. 3 extends not only above the inlet 3, but also partly at the level of the inlet 3 and partly below the inlet 3. The auxiliary wall 7, at the level of and below the inlet 3, does not extend over its entire circumference, but only over a part of its circumference. The auxiliary wall 7 only extends to the height of and/or below the inlet 3 at a distance from the inlet opening. The auxiliary wall 7 is thereby formed so that the flow of gas and liquid streaming out of the inlet 3 ends up almost directly impacting the inner wall 2. In other words, the auxiliary wall 7 will only extend at a predetermined distance from an imaginary extension of the tube component that forms the inlet 3. The predetermined distance is related to the maximum angle at which the flow comes out of the inlet 3. Typically, the distance is greater than 2 cm, preferably greater than 4 cm.

By forming the auxiliary wall 7 as shown in FIG. 3, the flow of gas and liquid will almost completely directly impact against the inner wall 2 of the housing of the cyclone separator 1. As a result, a large part of the liquid in the flow will impact against the inner wall 2. A vortex is created because the flow at least partially tangentially impacts against the inner wall 2. The auxiliary wall 7 ensures that the vortex is maximally shielded from liquid 6 located at the inner wall 2. In the embodiment of FIG. 3, there is therefore an overlap between the lower segment 16 and the middle segment 18. This overlap is the result of the auxiliary wall 7, which does not extend over its entire circumference to the same height in the cyclone separator 1. The vortex will be partially bounded at the location of the overlap by the auxiliary wall 7 and partially bounded by the inner wall 2. The auxiliary wall 7 from FIGS. 1, 2 and 3 has a further effect.

The auxiliary wall 7 will preferably extend, viewed in the height direction, over at least 70% of the distance between the inlet 3 and the outlet 4, more preferably over at least 80% of the distance between the inlet 3 and the outlet 4, and most preferably over at least 85% of the distance between the inlet 3 and the outlet 4. Furthermore, the auxiliary wall 7 will extend, viewed in the height direction, over less than 100% of the distance between the inlet 3 and the outlet 4. Namely, when the auxiliary wall would extend over 100% or more of the distance between the inlet 3 and the outlet 4, the vortex should first have a downward component to penetrate the auxiliary wall. This would also have the consequence that the inlet can almost never be directed completely against the inner wall when the ring thickness dk is smaller than the diameter of the inlet di. On the basis of the above explanation, it is clear that the auxiliary wall in FIG. 3 extends over less than 100% of the distance between the inlet 3 and the outlet 4, because the auxiliary wall starts above the inlet at the location of zone 15.

As described above, the auxiliary wall 7 shields the liquid 6 at the inner wall 2 from the vortex, at least in the middle segment 18. A further effect improves the separation of liquid from the flow of gas and liquid. Because the vortex extends through the auxiliary wall 7 to the outlet 4, centrifugal force at the height of the auxiliary wall 7 will also move residual liquid out of the flow. The collected liquid is indicated in the figures by reference number 9. The residual liquid deposits against the inner side of the auxiliary wall, where it forms a film that typically flows downwards due to gravity. The film on the auxiliary wall is typically much thinner and therefore much smoother than the film on the inner wall. At a lower edge of the auxiliary wall 7, the residual liquid 9 will typically drip and end up with the collected liquid 12. To facilitate the dripping, in particular to influence the position of the dripping, the auxiliary wall 7 can be provided with a drip nozzle. One or more drip nozzles can ensure that the dripping does not occur, or occurs less, near the inlet 3. Dripping above the inlet would allow the dripped liquid to be easily carried away by the flow, ending up in the vortex again. A skilled professional understands that the droplet position can be chosen to minimize the re-uptake of liquid to the vortex. To minimize interaction between the collected liquid 12 and the vortex, a structure may be provided, for example, in the form of a cone provided above the liquid surface. Such a cone is known in the profession as a "Chinese hat" or "dollar plate" and would shield the liquid surface from the vortex to minimize liquid re-uptake.

Because the liquid 6 deposits against the inner wall 2 and the residual liquid 9 deposits against the inner wall 7, a two-stage separation is achieved. In particular, liquid is separated from the flow of gas and liquid in two stages. As a result, the flow at the location of the outlet 4 will contain considerably less liquid than at the location of the inlet 3. In practice, the flow's load at the location of the outlet can be up to a thousand times smaller than the load at the location of the inlet 3. This is due to the combination of the double separation on the one hand, and on the other hand due to reducing the uptake of the liquid 6 back into the flow by shielding the liquid 6 via the auxiliary wall 7. It will be clear to a skilled professional that an additional auxiliary wall (not shown) can be provided within the auxiliary wall in a comparable manner to the inner wall 2 and the auxiliary wall 7. A three-stage separation can be achieved through the additional auxiliary wall.

Figure 4A:
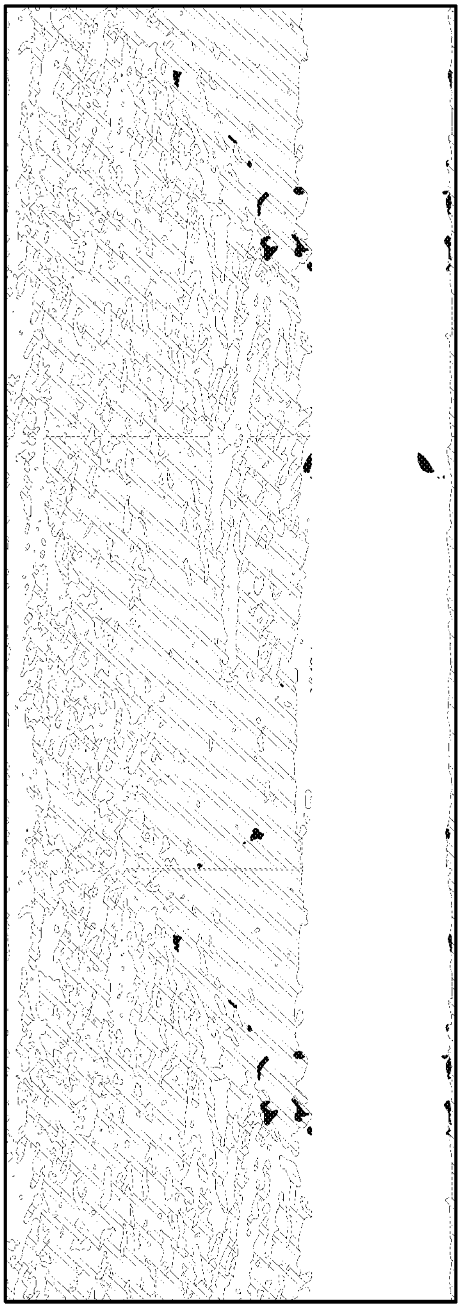
FIGS. 4A and 4B show diagrams of the re-uptake of liquid in the flow.
Figure 4B:
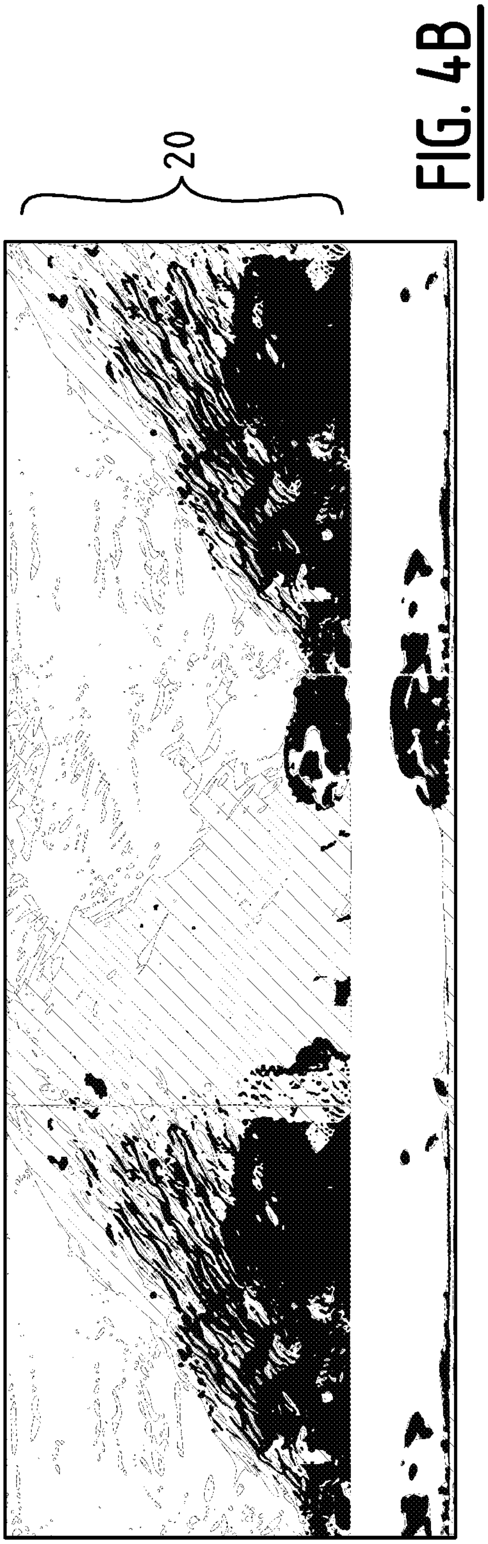

FIG. 4 illustrates the difference in operational efficiency between a conventional cyclone separator without an auxiliary wall 7 and a cyclone separator according to the invention. FIG. 4B shows an inside of a single-walled cyclone separator. In particular, it shows a contact surface between the vortex and the wall on which liquid is deposited. The dark zones in the figure indicate a high re-uptake of liquid in the vortex. Dark zones are therefore an indication of a negative or adverse effect of the cyclone separator. In other words, the fewer dark zones, the better the cyclone separator works. FIG. 4B illustrates that re-uptake of liquid in the vortex is very common and has some hot spots. These hot spots are typically located at the inlet 3 and in the zone where the flow first impacts against the inside. In FIG. 4B, reference number 20 denotes the inside, formed by a single inner wall according to the current technique.

FIGS. 4A and 4B illustrates the difference in operational efficiency between a conventional cyclone separator without an auxiliary wall 7 and a cyclone separator according to the invention. FIG. 4B shows an inside of a single-walled cyclone separator. In particular, it shows a contact surface between the vortex and the wall on which liquid is deposited. The dark zones in the figure indicate a high re-uptake of liquid in the vortex. Dark zones are therefore an indication of a negative or adverse effect of the cyclone separator. In other words, the fewer dark zones, the better the cyclone separator works. FIG. 4B illustrates that re-uptake of liquid in the vortex is very common and has some hot spots. These hot spots are typically located at the inlet 3 and in the zone where the flow first impacts against the inside. In FIG. 4B, reference number 20 denotes the inside, formed by a single inner wall according to the current technique.

Figure 5:
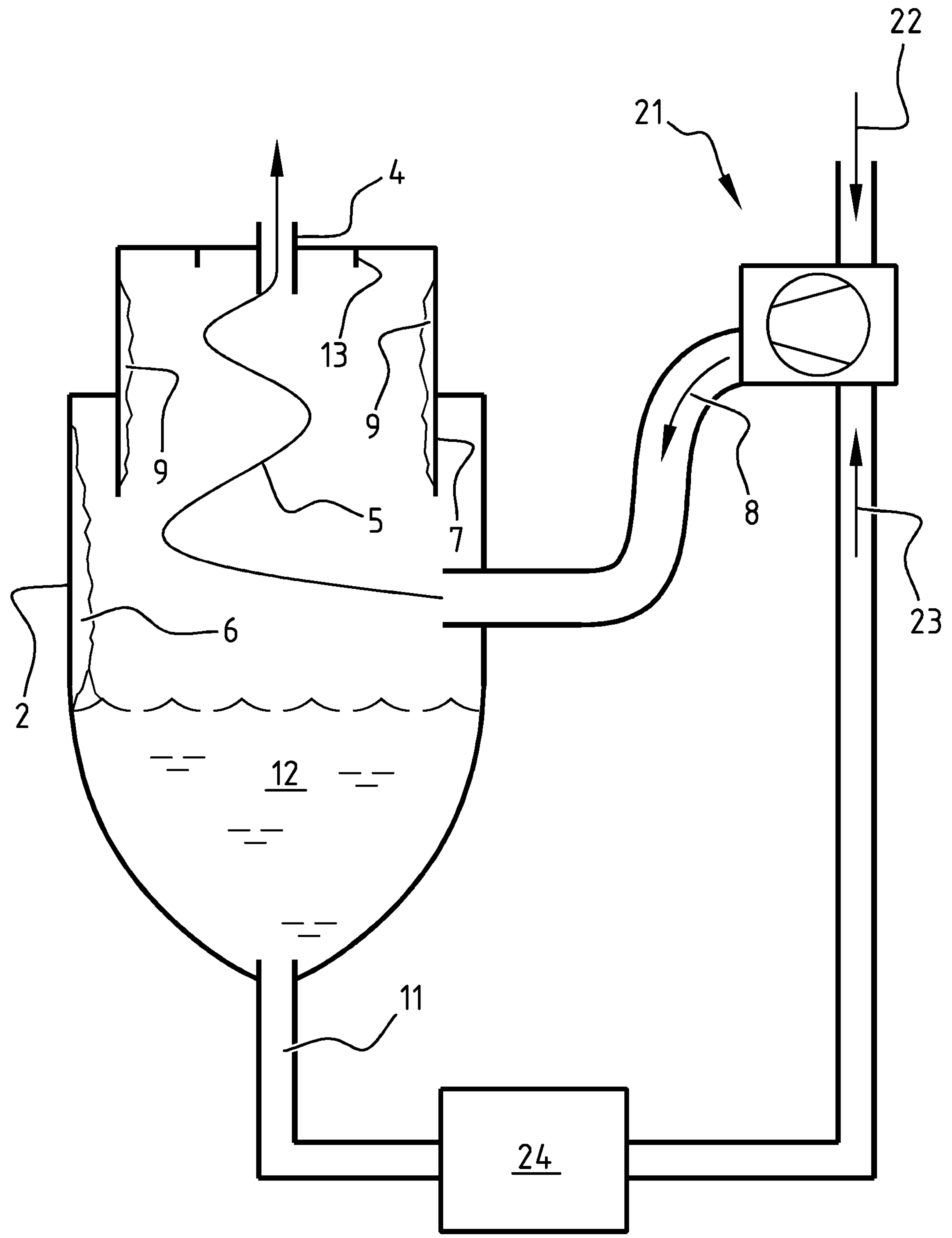
FIG. 5 shows a compressor with a cyclone separator according to an embodiment of the invention.

FIG. 5 shows a compressor 21 for compressing gas. The compressor 21 has a gas inlet 22. Via the gas inlet 22, gas to be compressed is fed into at least one compressor element of the compressor 21. The gas to be compressed can be air, nitrogen or oxygen, or another gas or mixture of gases. The compressor 21 also has a liquid supply 23. Liquid can be supplied to the compressor element via the liquid supply 23. It is known in compressor technology that supplying liquid has multiple effects, including lubricating the compressor 21 and sealing the compressor during compression, etc. The liquid 23 can be, for example, oil or water, typically selected depending on the application.

The primary purpose of the compressor 21 is to compress the gas 22 to be compressed. However, by supplying the liquid 23, the flow 8 coming from the compressor element will not only contain compressed gas, but will also contain a significant amount of liquid. By connecting the outlet of the compressor element to the inlet of the cyclone separator 1 according to the invention, the majority of the liquid can be separated from the flow 8. This offers the further possibility of connecting the discharge opening 11 directly or indirectly to the liquid inlet 23, so that an almost closed circuit is created in which liquid can be reused. In practice, typically liquid resources 24 will be provided. Liquid resources 24 may contain filters or may include a cooling and/or heating mechanism for cooling and/or heating the gas flow and/or the liquid flow. For the operation of the cyclone separator 1 from FIG. 5, reference is made to the description from FIG. 1 above.

It will be clear to a skilled professional that the cyclone separator does not necessarily have to be arranged vertically in use. In the vertical arrangement, the longitudinal axis of the housing is parallel to the vertical axis. The longitudinal axis of the housing can also be placed at an angle with respect to the vertical axis. In a special type of use, the housing can be placed horizontally, with its longitudinal axis at a mainly right-angle to the vertical axis. Even when the housing is not used in a vertical arrangement, it may have the properties from this description. The arrangement during use is therefore not restrictive for the definition of the invention. When the cyclone separator in any orientation contains the properties of the claims, it will be considered as falling within the scope of protection. Relative terms that indicate a position of elements and/or parts in the cyclone separator, such as top, bottom and side wall, will always be interpreted with respect to the cyclone separator in the vertical arrangement.

On the basis of the above description, it will be understood by a skilled professional that the invention can be implemented in different ways and based on different principles. In addition, the invention is not limited to the embodiments described above. The embodiments described above, as well as the figures, are merely illustrative and serve only to increase the understanding of the invention. The invention will therefore not be limited to the embodiments described herein, but is defined in the claims.

The invention claimed is:

1. A cyclone separator (1) for separating liquid from a flow (8) of gas and liquid, whereby the cyclone separator comprises a housing with a mainly tubular inner wall (2), an inlet (3) for the flow being provided in the housing to carry the flow at least partially tangentially against the inner wall, furthermore an outlet (4) being provided at the top of the housing, all so that during operation the flow forms a vortex (5) between the inlet and the outlet, and whereby the liquid (6) impacts against the inner wall due to centrifugal force in order to be discharged (11), wherein the housing has, at least in a zone above the inlet, a mainly tubular auxiliary wall (7), whereof an outer side is spaced from and directed towards the inner wall, so that during operation the vortex is at least partially bounded by an inner side of the auxiliary wall to reduce contact between the vortex and the liquid at the inner wall, and wherein the tubular auxiliary wall has a top end and a bottom end, the bottom end being provided at least partially above the inlet.

2. The cyclone separator according to claim 1, whereby the inlet is oriented so that, during operation, the flow is carried almost completely directly to the inner wall via the inlet.

3. The cyclone separator according to claim 1, whereby the inlet is formed by an inlet tube component that extends through the inner wall and at least partially into the housing.

4. The cyclone separator according to claim 1, whereby the auxiliary wall is positioned relative to the inner wall so that, during operation, a lower segment of the vortex is bounded by the inner wall along its circumference and an uppermost segment of the vortex is bounded along its circumference by the inner side of the auxiliary wall.

5. The cyclone separator according to claim 1, whereby, during operation, residual liquid (9) impacts out of the flow due to centrifugal force against the inner side of the auxiliary wall in order to obtain a two-stage separation.

6. The cyclone separator according to claim 1, whereby a mainly annular chamber (10) is formed between the inner wall and the outer side of the auxiliary wall with a ring thickness (dk) determined by the distance between the inner wall and the outer side, which chamber is open at the bottom to allow liquid at the inner wall to flow in and out of the chamber.

7. The cyclone separator according to claim 6, whereby the chamber has a height (h) that is greater than the ring thickness.

8. The cyclone separator according to claim 6, whereby the annular chamber is closed at the top.

9. The cyclone separator according to claim 6, whereby the ring thickness is smaller than a diameter (di) of the inlet.

10. The cyclone separator according to claim 1, whereby the inner wall is formed around a first axis and whereby the auxiliary wall is formed around a second axis, with the first axis and the second axis mainly coinciding.

11. The cyclone separator according to claim 10, whereby the inner wall forms a lower segment of the housing, and whereby the auxiliary wall together with the inner wall extend to the top of the housing.

12. The cyclone separator according to claim 1, whereby the housing has a discharge opening (11) at the bottom for discharging the liquid.

13. A compressor for compressing a gas, which compressor is provided with at least one compressor element with an outlet for compressed gas, whereby the aforementioned outlet for compressed gas is connected to the inlet of the cyclone separator according to claim 1.

14. The method for separating liquid from a flow of liquid and gas comprising:

introducing the flow through an inlet into a housing with a mainly tubular inner wall and an auxiliary wall disposed inside the tubular inner wall, with the flow impacting at least partially tangentially against the inner wall, wherein a bottom of the auxiliary wall is disposed at least partially above the inlet;

discharging the flow through an outlet provided at the top of the housing;

all so that:

the flow forms a vortex between the inlet and the outlet; and the liquid impacts against the inner wall due to centrifugal force in order to be discharged, and whereby the method comprises discharging the liquid;

wherein the vortex, at least in a zone above the inlet, extends at least partially against an inner side of the auxiliary wall in order to reduce contact between the vortex and the liquid at the inner wall.

15. The method according to claim 14, whereby residual liquid impacts against the inner side of the auxiliary wall to be discharged, and whereby the method comprises further discharge of the residual liquid.

16. The cyclone separator according to claim 1, wherein the top end of the auxiliary wall extends above the top of the housing and has an auxiliary top provided thereon, and the outlet is provided in the auxiliary top.

* * * * *